United States Patent
Edwards et al.

(10) Patent No.: US 9,909,932 B2
(45) Date of Patent: Mar. 6, 2018

(54) SYSTEM AND METHOD FOR TEMPERATURE SENSING IN AN INTERNAL COMBUSTION ENGINE

(71) Applicants: William E. Edwards, Ann Arbor, MI (US); Michael R. Garrard, Jaywick (GB)

(72) Inventors: William E. Edwards, Ann Arbor, MI (US); Michael R. Garrard, Jaywick (GB)

(73) Assignee: NXP USA, Inc., Austin, TX (US)

( * ) Notice: Subject to any disclaimer, the term of this patent is extended or adjusted under 35 U.S.C. 154(b) by 525 days.

(21) Appl. No.: 14/588,521

(22) Filed: Jan. 2, 2015

(65) Prior Publication Data

US 2016/0195454 A1    Jul. 7, 2016

(51) Int. Cl.
  *G01K 7/42*   (2006.01)
  *G01K 7/18*   (2006.01)
  *G01K 13/08*  (2006.01)

(52) U.S. Cl.
  CPC ............. *G01K 7/42* (2013.01); *G01K 7/18* (2013.01); *G01K 13/08* (2013.01)

(58) Field of Classification Search
  CPC . G01K 7/42; G01K 7/18; G01K 13/08; F01C 1/07
  See application file for complete search history.

(56) References Cited

U.S. PATENT DOCUMENTS

| 5,200,697 | A  | * | 4/1993 | Adler | G01K 13/08 188/DIG. 1 |
| 5,381,090 | A  | * | 1/1995 | Adler | G01K 13/08 188/DIG. 1 |
| 6,949,945 | B2 |   | 9/2005 | Klein | |
| 7,077,566 | B2 |   | 7/2006 | Rajendran et al. | |
| 7,573,391 | B2 |   | 8/2009 | Adam | |
| 2002/0074857 | A1 | * | 6/2002 | Babico | B60T 8/171 303/199 |
| 2002/0109501 | A1 | * | 8/2002 | Schroeder | G01D 5/147 324/207.21 |

(Continued)

OTHER PUBLICATIONS

Welch, Jr., Richard, "Recognizing Motor Temperature Sensor Limitations", Exlar Corp., Chanhassen, Minn., Aug. 1, 2010 (6 pgs.).

*Primary Examiner* — Lisa Caputo
*Assistant Examiner* — Philip Cotey

(57) ABSTRACT

A system for determining a temperature of a first portion of an engine, and related circuit, and related method of operation, are disclosed. In one example embodiment, the system includes a wheel having a plurality of magnetic teeth, and an electrical circuit including a variable reluctance sensor (VRS) including at least one winding, the VRS being positioned proximate the wheel, where the VRS is in thermal contact with the first portion, and a comparator having first and second input terminals and an output terminal, where the comparator is configured to output an output signal at the output terminal. Either the output signal or a further signal generated by the electrical circuit is at least indirectly indicative of a resistance of the at least one winding, whereby an indication of the temperature of the first portion can be determined based upon the output signal or further signal.

20 Claims, 3 Drawing Sheets

(56) References Cited

U.S. PATENT DOCUMENTS

| | | | | |
|---|---|---|---|---|
| 2004/0079589 | A1* | 4/2004 | Schneider | F01M 11/0004 |
| | | | | 184/1.5 |
| 2004/0080333 | A1* | 4/2004 | Klein | G01K 7/183 |
| | | | | 374/185 |
| 2007/0129908 | A1* | 6/2007 | Adam | G01K 13/08 |
| | | | | 702/130 |
| 2007/0277776 | A1* | 12/2007 | Thomas | F02D 41/062 |
| | | | | 123/299 |
| 2008/0262702 | A1* | 10/2008 | Bamba | F02D 41/009 |
| | | | | 701/103 |
| 2012/0089299 | A1* | 4/2012 | Breed | B60C 11/24 |
| | | | | 701/36 |
| 2013/0253800 | A1 | 9/2013 | Barbaza | |
| 2014/0277829 | A1* | 9/2014 | Hale | G07C 5/00 |
| | | | | 701/1 |

\* cited by examiner

- $R_{VRS} = V_{TEST}/I_{TEST}$
- $R1 = R0(1+TC(T1-T0))$  $TC$ = TEMP COEF
- $T1 = T0 + ((R1/R0) - 1)/TC)$  $R1 = R$ @ $T1$

EQUIVALENT CIRCUIT

SYSTEM AND METHOD FOR TEMPERATURE SENSING IN AN INTERNAL COMBUSTION ENGINE

CROSS-REFERENCE TO RELATED APPLICATIONS

--

STATEMENT REGARDING FEDERALLY SPONSORED RESEARCH OR DEVELOPMENT

--

FIELD OF THE DISCLOSURE

The present disclosure relates to internal combustion engine systems and methods for operating same and, more particularly, to systems and methods for achieving temperature sensing in internal combustion engines.

BACKGROUND OF THE DISCLOSURE

Optimizing the operation of an internal combustion engine (or engine) for power, efficiency, and emissions typically involves monitoring or sensing one or multiple parameters that affect combustion and adjusting ignition and fuel scheduling based on the sensor outputs. These parameters can include, for example, any one or more of engine speed, acceleration/deceleration, cylinder head temperature, mass air flow, manifold pressure, crank position, oxygen content in the exhaust and engine load. The temperature of an internal combustion engine can affect engine starting and performance, and so it is desirable to monitor cylinder head temperature and thereby adjust any of a variety of aspects of engine operation that are dependent upon temperature, including ignition timing and air-to-fuel ratios, in order to optimize engine performance. Among other things, engine cylinder head temperature is typically important for determining air-to-fuel ratios. For example, when the cylinder head temperature is less than about 70 degrees Fahrenheit, cold enrichment becomes appropriate.

Carbureted engines include certain features that allow engines to be operated in manners by which various conditions, and particularly varying temperature conditions, are taken into account. However, such designs also can entail certain disadvantages. For example, many carbureted engines include a choke by which the air-to-fuel ratio can be adjusted manually by an operator. Yet such systems are limited because actuation of the choke involves guess work on the part of the operator as to the level of actuation of the choke that is appropriate under any given circumstance, and further because in many such embodiments the choke is controlled at least in part by way of a temperature sensitive spring that can introduce inaccuracy and drift into the system. Also for example, other more complicated engines such as engines that employ electronic fuel injection may include a fully automated system that can employ temperature information measured by way of a thyristor or other sensing element(s) that serves to sense engine (e.g., cylinder head) temperature. Yet the thyristor or other additional sensing element(s) typically is or are additional components that add cost to the system. For these reasons and/or other reasons, it would be advantageous if simplified or improved systems and methods for engine temperature sensing could be developed.

DETAILED DESCRIPTION

The present disclosure recognizes the importance of accurately performing engine temperature sensing and additionally recognizes the desirability of minimizing the cost of components used to perform such temperature sensing. It has been additionally recognized that many engines include a variable reluctance sensor (VRS) that is employed to sense crankshaft rotation (or a quantity related thereto) by sensing the passing of teeth on a rotating wheel or similar structure. It has further been recognized that such a VRS exhibits a resistance characteristic that varies depending upon engine temperature and that particularly is measurable at times when teeth on the rotating wheel or similar structure are not directly adjacent to the VRS, that is, at times when spaces between neighboring teeth on the rotating wheel or similar structure are adjacent to the VRS. By detecting the resistance exhibited by the VRS and comparing that detected resistance with information concerning the known relationship between that resistance and temperature, the temperature of the VRS and therefore the temperature of the engine can be detected. Thus, the VRS can perform or assist in the performing of two functions in a dovetailed manner, namely, the function of sensing crankshaft rotation and the function of sensing engine temperature, and the sensed engine temperature information can then be used for any of a variety of purposes including engine control purposes.

Figure 1:
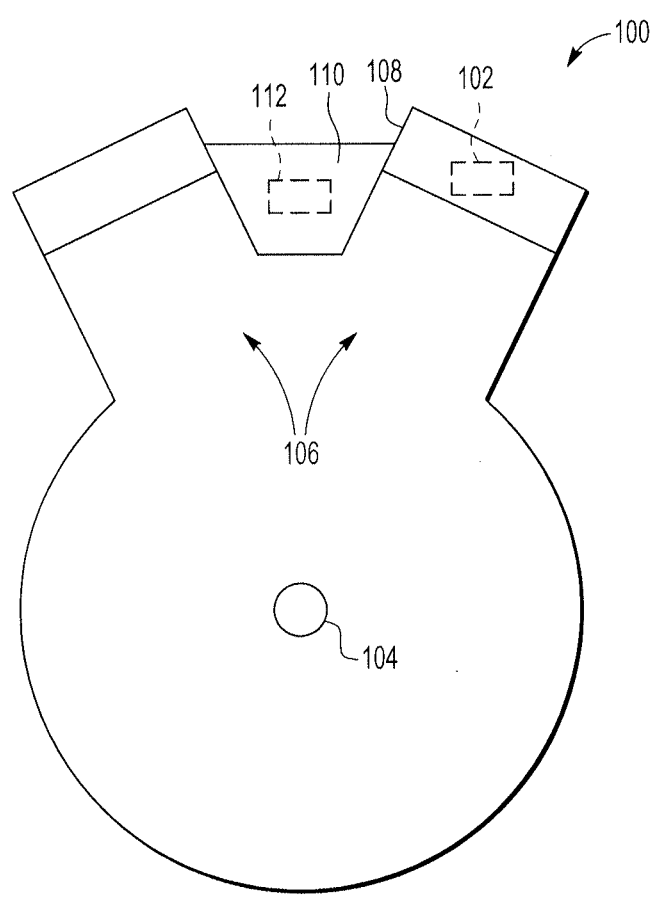
FIG. 1 is a front elevation view of an example internal combustion engine that includes an example temperature sensing system (shown figuratively) in accordance an embodiment of the present disclosure.

Referring now to FIG. 1, a front elevation view of an internal combustion engine 100 is provided, and this front elevation view particularly shows the engine as having a temperature sensing system 102 shown figuratively as a dashed box. In the present embodiment, the engine 100 is a horizontal-crankshaft internal combustion engine having a crankshaft 104 and a plurality of cylinders 106 arranged in a Vee-type arrangement. The temperature sensing system 102 particularly is (or at least part of that system is) arranged on or proximate to one of the cylinder heads of one of the cylinders 106, shown as a first cylinder head 108. By virtue of this arrangement, the temperature sensing system 102 is capable of being exposed to, and sensing, the temperature at the first cylinder head 108, which in at least some cases can be considered to be representative of the operational temperature of the combustion chamber (and thus representative of the operational temperature of the engine, at least in a general sense). In the present embodiment, a mixture of air and fuel enters the cylinders by way of a carburetor 110 that includes a choke (or choking mechanism) 112 shown figuratively by a dashed box. As will be described in further detail below, the temperature sensing system 102 particularly includes a VRS that both provides signals that indicate rotation of the crankshaft 104 and also experiences a resistance that varies with changes in engine temperature that, upon being sensed, can be used to determine engine temperature.

Although the internal combustion engine 100 in the present example embodiment has the features discussed above, the present disclosure is intended to encompass any of a variety of other types of internal combustion engines on which temperature sensing systems such as the system 102 (and/or as further discussed below) can be implemented. For example, in other embodiments encompassed herein, the internal combustion engine can be a vertical-crankshaft engine, or can have one or more cylinders arranged in other than a Vee-type arrangement including, further for example, a single-cylinder engine. Depending upon the embodiment, the engine can take on any of a variety of shapes or be suitable for any of a variety of applications and, in at least some embodiments, the engine is a small engine suitable for applications in lawn mowers, snow blowers, chain saws, or other power tools, for example. Although the engine 100 includes the choking mechanism 112, in other embodiments the air-fuel mixture provided to the cylinders can be controlled by way of other devices such as, for example, by way of fuel injectors.

Figure 2:
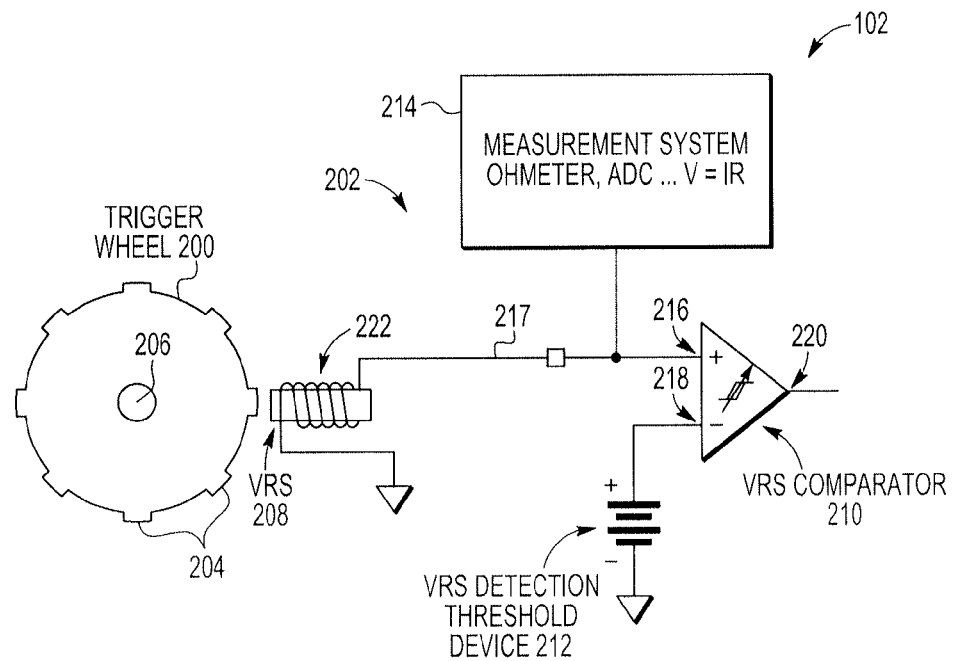
FIG. 2 is an electrical schematic showing example components of the example temperature sensing system of FIG. 1.

Referring now to FIG. 2, an electrical schematic shows example components of the temperature sensing system 102, in accordance with embodiments of the present invention. The components of the temperature sensing system 102 are first described below, and subsequently there is provided description concerning the operation of the temperature sensing system. As shown, the system 102 includes two major subsystems (or systems), namely a crank angle detection system (or subsystem) 202 and a winding resistance sensing or measurement system (or subsystem) 214. The crank angle detection subsystem 202 particularly includes a trigger wheel 200, a variable reluctance sensor (VRS) 208, a VRS comparator 210, and a VRS detection threshold device 212, with the VRS 208 particularly being in thermal contact with the first cylinder head 108 of the engine 100. The VRS 208 can be of conventional design and, in the present embodiment, can take the form of an inductive pickup (e.g., a coil wrapped around a piece of metal). The measurement system 214 in the present embodiment is a circuit that is configured to measure the resistance of windings (discussed further below) of the VRS 208. Because the windings have a known temperature coefficient of resistance (e.g., that of the copper forming the winding), temperature can be determined by the change of resistance.

The trigger wheel 200 particularly includes a plurality of magnetic (or magnetized) teeth 204 that are spaced apart from one another and arranged around an outer circumference of the trigger wheel 200. The trigger wheel 200 is configured to rotate about a central axis 206 at a speed directly or indirectly determined by a rotational speed of the crankshaft 104 of the engine 100. More particularly, in the present embodiment, the central axis 206 is coupled to and driven by the crankshaft 104. Depending upon the embodiment, the magnetic teeth 204 can be made of a ferrous material or other material that can be detected by a VRS. It should additionally be appreciated that, although the temperature sensing system 102 above is described as including the detection system 202 and the measurement system 214, the temperature sensing system 102 also can be viewed as including an electrical system that includes all of the components of the detection and measurement systems 202, 214 excepting the trigger wheel 200.

As shown, the VRS 208 includes one or more wire windings (or coils) 222. Depending upon the embodiment, the VRS 208 can be single-ended or differential wired. The VRS comparator 210 can for example be an operational amplifier. The VRS detection threshold device 212 can for example be a battery or another voltage source. More particularly as shown, the VRS 208 is directly coupled between ground and a non-inverting (or positive) terminal 216 of the VRS comparator 210, with that coupling being achieved by a linkage 217, and the VRS detection threshold device 212 is coupled between ground and an inverting (or negative) terminal 218 of the VRS comparator 210 (where, in the present embodiment, the positive polarity terminal of the VRS detection threshold device is coupled to the inverting terminal and the negative polarity terminal of that device is coupled to ground). Further, the VRS comparator 210 also includes an output terminal 220 and provides an output signal (or output signals) at that output terminal that is based upon the relative voltages experienced at the non-inverting and inverting terminals 216 and 218.

It should be appreciated that the trigger wheel 200, VRS 208, VRS comparator 210, and VRS detection threshold device 212 together form a subsystem that can be present on many conventional engines and that particularly can allow for the engine (or a controller thereof) to sense the crank angle or crankshaft rotational speed. Such sensing can be achieved because a voltage is generated in the VRS 208 whenever one of the teeth 204 passes by the VRS during rotation of the trigger wheel 200 such that the windings are exposed to a changing magnetic flux. More particularly, when one of the magnetic teeth 204 is substantially aligned with and passing alongside the VRS 208 such that a changing magnetic flux arises at the windings 222 of the VRS, the VRS then generates a voltage that in turn produces an elevated voltage at the non-inverting terminal 216 of the VRS comparator 210. Upon the non-inverting terminal 216 experiencing this elevated voltage (particularly when that voltage exceeds the voltage experienced at the inverting terminal 218), the output signal provided at the output terminal 220 of the VRS comparator 210 in turn takes on a high value. Otherwise, when the voltage applied to the non-inverting terminal 216 is less than the voltage applied to the inverting terminal 218, the output signal provided at the output terminal 220 takes on a low level.

As already noted, the trigger wheel 200, VRS comparator 210, and VRS detection threshold device 212 allow for sensing of the passing of the teeth 204 by the VRS 208, and these components therefore can allow for determinations to be made regarding crankshaft angle and crankshaft speed. Additionally, in the present embodiment the temperature sensing system 102 further includes the measurement system 214 that also allows for indirect determinations of the temperature of the first cylinder head 108 (and thus of the engine 100) to be made. The measurement system 214 can take a variety of forms depending upon the embodiment. In at least some embodiments, the measurement system 214 can include for example an ohmmeter or an analog-to-digital converter (ADC). As shown, the measurement system 214 is particularly coupled to the non-inverting terminal 216 (or coupled to the linkage 217 electrically coupling the VRS 208 and that non-inverting terminal), such that a terminal of the measurement system is connected to both the non-inverting terminal 216 and the VRS 208, particularly to one terminal of the windings 222 thereof. By virtue of operation of the measurement system 214 in relation to the remainder of the temperature sensing system 102 as described below in regard to FIG. 3, the resistance of the windings 222 of the VRS 208 can be measured, and this can be used as an indication of the temperature of the first cylinder head 108 and the temperature of the engine 100 overall.

Figure 5:
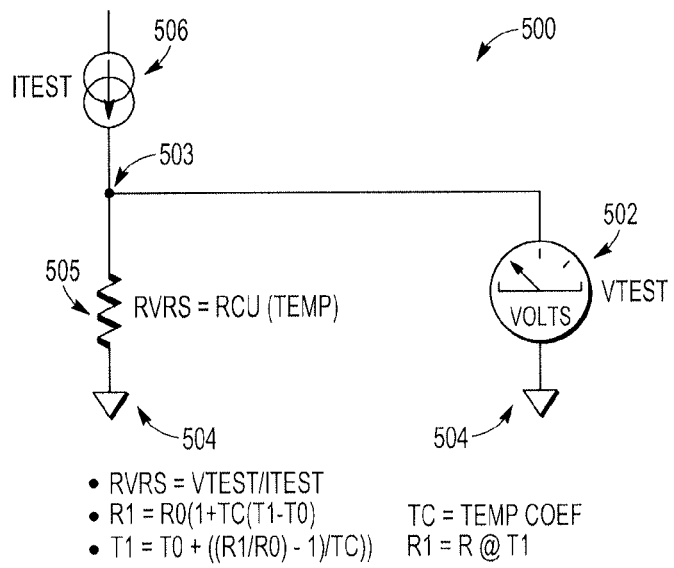
FIG. 5 is a further electrical schematic providing an illustrative high level equivalent circuit intended to correspond to the temperature sensing system of FIG. 1.

Referring additionally to FIG. 5, a further schematic illustrates a high-level equivalent circuit 500 corresponding to the temperature sensing system 102 of FIG. 2. In particular, it can be seen that the equivalent circuit 500 includes a voltage measurement device 502 that detects a voltage Vtest appearing between a node 503 and a ground terminal 504 (which is grounded) across a resistor 505 coupled between the node 503 and terminal 504. The voltage across the resistor 505 appears because of a current Itest driven through the resistor by a current source 506, which for example can be considered as corresponding to the voltage generated in the windings 222 of the VRS 208. The voltage Vtest that is detected is indicative of the resistance Rvrs of the resistor 505, which equals Vtest/Itest. It should be appreciated that the resistor 505 having the resistance Rvrs is the component shown in FIG. 5 that constitutes (or corresponds to) the VRS 208. The resistance Rvrs is actually a resistance of the copper of the windings of the VRS that varies with temperature, Rcu (Temp). Further as indicated in FIG. 5, the temperature T can be calculated based upon the temperature coefficient (TC), initial values of the resistance (Ro) and temperature (To), and the current value of the resistance (R1) (where R1=R@T1), by way of the formulas R1=Ro(1+TC(T1−To)) and T1=To+((R1/Ro)−1)/TC, which are respectively referred to below as equation (1) and equation (2). It should further be noted that these calculations can be performed by way of a processing device such as a microprocessor or microcontoller (MCU) or in a lookup table, for example, as can form or be part of the measurement system 214.

Figure 3:
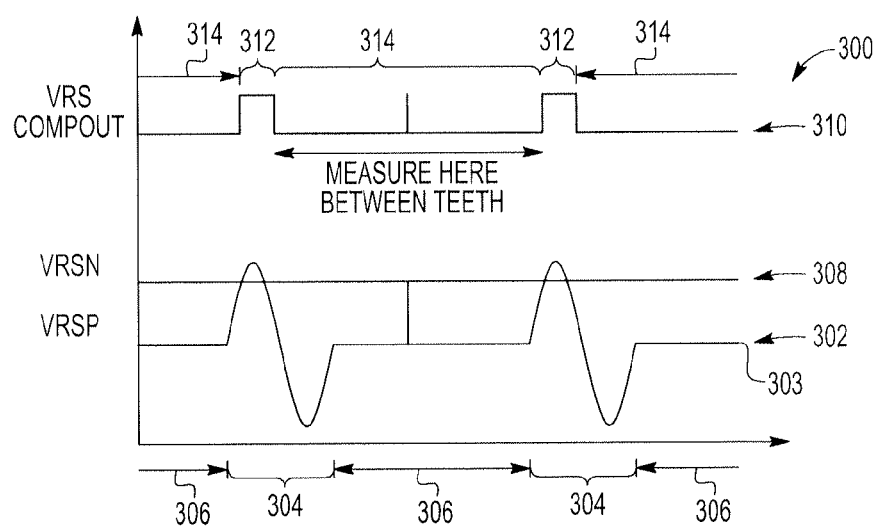
FIG. 3 is a timing diagram showing example signal variation of several signals communicated in relation to the temperature sensing system of FIGS. 1 and 2.

Turning to FIG. 3, a timing diagram 300 is provided that shows example signal variation of several signals communicated in relation to the temperature sensing system 102 (and particularly the detection system 202 thereof) shown in FIGS. 1 and 2 when the trigger wheel 200 rotates due to operation of the engine 100. More particularly, FIG. 3 shows an example VRSP signal 302 that represents a voltage signal applied to the non-inverting (positive) terminal 216 of the VRS comparator 210 in response to the rotation of the trigger wheel 200. It can be seen that the VRSP signal 302 particularly includes time periods 304 when the VRSP signal varies upward from a base value 303, then downward below the base value, and then back upward to the base value in a sinusoidal (or nearly-sinusoidal) manner, but at all other time periods 306 remains at the base value. The variations in the VRSP signal 302 that occur during each of the time periods 304 occur particularly due to the passing of a respective one of the magnetic teeth 204 by the VRS 208, which causes a voltage to be induced in the windings 222 thereof. At the other time periods 306, when none of the teeth 204 are passing by the VRS 208 (e.g., when the VRS 208 is adjacent to one of the spaces between neighboring ones of the teeth 204), the VRSP signal 302 remains at the base value (303).

It will be appreciated that, due to the VRS detection threshold device 212, in the present embodiment, a constant voltage is applied to the inverting (negative) terminal 218 of the VRS comparator 210, as represented by a VRSN signal 308 also shown in FIG. 3. Given the application of the VRSP signal 302 to the non-inverting terminal 216 and the VRSN signal 308 to the inverting terminal 218 of the VRS comparator 210, due to the operation of the VRS comparator, the VRS comparator outputs at the output terminal 220 an output signal 310 additionally shown in FIG. 3. As shown, the output signal 310 particularly is a square wave that takes on a high value (e.g., 5 Volts) at times 312 when the value of the VRSP signal 302 surpasses the value of the VRSN signal 308 and that otherwise at all other times 314 takes on a low value (e.g., 0 Volts). Given this relationship between the output signal 310 and the VRSP and VRSN signals 302 and 308, it can be seen that the periodicity of the output signal 310 reflects the periodicity of the time periods 304, which in turn reflects the rotational speed of the trigger wheel 200 and particularly the time intervals between the passing of successive ones of the magnetic teeth 204 past the VRS 208.

The output signal 220 of the VRS comparator 210 can be used for a variety of purposes during engine operation, and as already mentioned above can particularly be used as an indication of the speed of the trigger wheel 200 and thus of the crankshaft 104. This sensing is particularly performed at times when ones of the teeth 204 are adjacent to the VRS 208. In addition to this capability of the detection system 202, the output signal 220 in the present embodiment also is used as a basis for determining appropriate times at which the resistance of the windings 222 of the VRS 208 can be measured by way of the measurement system 214. In the present embodiment, these resistance measurements are particularly made at times when the teeth 204 are not adjacent to the VRS 208 but rather the spaces between neighboring teeth are adjacent to the VRS. As already discussed, the measurement system 214 is configured to measure the resistance of the windings 222 (or the winding resistance) of the VRS 208. Therefore, in the present embodiment, a form of time-multiplexing is performed in order to sense two different characteristics of interest. At times when teeth are passing by (directly adjacent to) the VRS 208, the signals received from the VRS are used to sense crank angle/crankshaft rotation, but at times when the spaces in between neighboring ones of the teeth are passing by (directly adjacent to) the VRS 208, the signals received from the VRS are used to sense resistance that in turn is employed as an indication of engine temperature.

It should be appreciated that engine temperature can be determined based upon sensed resistance of the VRS 208 more particularly as follows. By virtue of the fact that the VRS 208 is in thermal contact with the engine or cylinder head and the windings of the VRS 208 have a temperature coefficient of resistance, it is possible to determine changes in temperature based upon and corresponding to changes in that resistance. However, because of manufacturing variability of the respective VRSs that can be employed in any given system and possibly other differences in VRS characteristics, in the present embodiment the measurement system 214 must be calibrated to measure absolute temperature. Calibration involves measuring the resistance at a known temperature or, in other words, mapping of resistance to temperature. This data can be stored in memory or in a lookup table in a microcontroller or in other manners.

The above-described equations (1) and (2) respectively are formulas relating resistance to temperature and relating temperature to resistance, respectively. It should be appreciated that, depending upon the embodiment, these relationships can be any of linear or exponential, or involve other types of relationships, and need not be in accordance with equations (1) and (2). Nevertheless, in at least some embodiments such as those in which the relationships are in accordance with equations (1) and (2), temperature change can be determined based upon the change in resistance. In making these determinations, it is also typically necessary to take into account a baseline resistance that corresponds to a particular baseline temperature. That is, different VRSs come off of the manufacturing line with different baseline winding resistances at respective given baseline temperatures (e.g. room temperature), and these need to be calibrated out in order to arrive at the proper resistance determinations based upon different changes in temperature.

As already noted above, in the present embodiment, it is only appropriate to measure the resistance of the windings 222 during the times 314 when the output signal 310 takes on a low value (at the times between the times 312 when the value of the output signal 310 is high), that is, when the system can be treated as "static". The resistance of the windings 222 of the VRS 208 more particularly can be determined as equaling the voltage applied to the non-inverting terminal 216 of the VRS comparator 210 divided by the current flowing into the measurement system 214 from the VRS 208 (or flowing out of the measurement system to the VRS 208), since it can be assumed that no current flows into or out of the non-inverting terminal 216 (which provides an effectively infinite impedance). That is, the winding resistance R during the times 314 is equal to the voltage V of the VRSP signal 302 divided by the current I conducted between the VRS 208 and the measurement system 214, according to the formula R=V/I (or V=IR). Upon determining the winding resistance, that winding resistance can then serve as (or be used to generate) an indication of the temperature of the engine 100 by measuring the change in the winding resistance versus the temperature of the VRS 208. Other embodiments can include interpolation or look-up tables to determine the temperature of the engine based upon the determined winding resistance.

Further, upon determining the winding resistance (or value(s) based thereon) that is indicative of engine temperature, the measurement system 214 can in turn provide that information to other components such as an electronic control module (not shown in FIG. 2 but shown in FIG. 4 discussed below) that makes use of that information during the monitoring or controlling of engine operation. In at least some embodiments, the sensed temperature information is used as an input parameter in a closed loop control system for the internal combustion engine. In particular, the electronic control module can in turn for example provide signals to an electrically driven choke 112 so that the choke is actuated in a manner taking into account the engine temperature, and/or provide signals to one or more other engine components (e.g., spark plugs or fuel injectors) to govern the operation of those component(s) in a manner that takes into account engine temperature.

Figure 4:
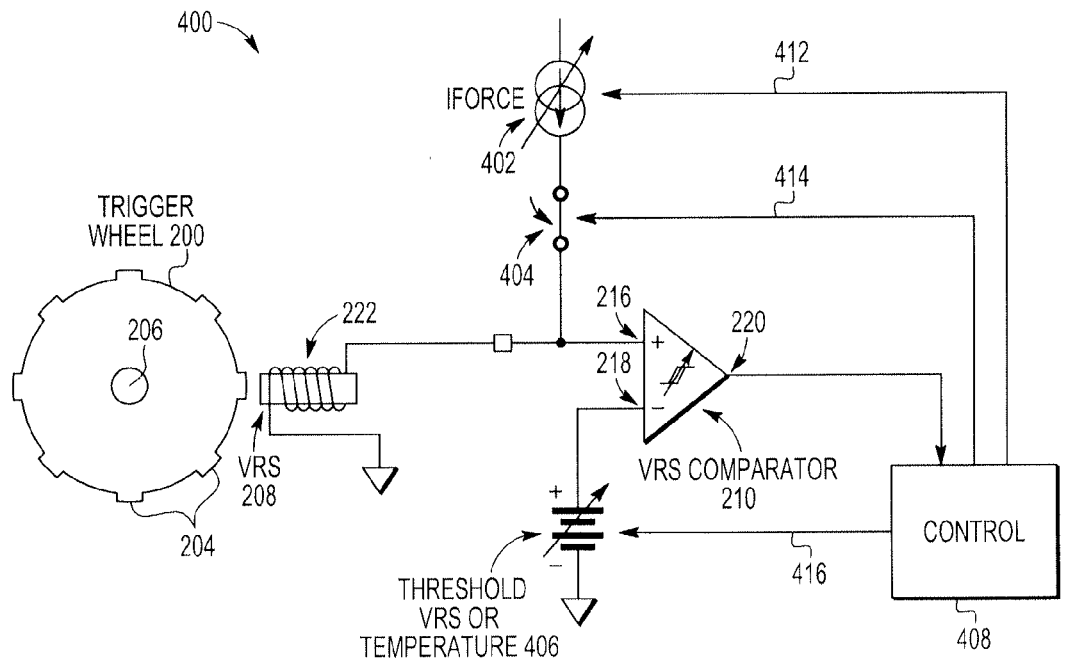
FIG. 4 is an additional electrical schematic showing example components of an additional example temperature sensing and control system differing somewhat from the temperature sensing system of FIGS. 1 and 2 in accordance with another embodiment of the present disclosure.

Referring next to FIG. 4, an additional electrical schematic diagram shows example components of an additional example temperature sensing and control system 400 that differs somewhat from the temperature sensing system 102 shown in FIGS. 1 and 2, and that is in accordance with another embodiment of the present disclosure. As with the temperature sensing system 102, the temperature sensing and control system 400 of FIG. 4 includes the trigger wheel 200 with the magnetic teeth 204 and the VRS 208 with the windings 222. Also, as with the temperature sensing system 102, the temperature sensing and control system 400 includes the VRS comparator 210 having each of the non-inverting terminal 216, the inverting terminal 218, and the output terminal 220, with the non-inverting terminal again being directly coupled to (that is, electrically short-circuited to) a terminal of the windings 222 of the VRS 208 by way of the linkage 217, and with the windings 222 of the VRS more particularly being coupled between the non-inverting terminal 216 and ground.

In addition to the above-discussed components, FIG. 4 also shows that the temperature sensing and control system 400 further includes a current source 402, a switch 404, a variable VRS detection threshold device 406, and an electronic control module (ECM) 408. More particularly, the current source 402 and switch 404 are coupled in series with one another, with the switch 404 linking the current source 402 with the non-inverting terminal 216 of the VRS comparator 210 (or to the linkage 217 connecting the non-inverting terminal 216 with the windings 222 of the VRS 208). Although the switch 404 is shown to be in the closed (conducting) position in FIG. 4 such that the current source 402 is short-circuited to the non-inverting terminal 216 (and likewise short-circuited to the windings 222), it should be appreciated the switch 404 can also be controlled so as to be opened so that the current source 402 is no longer electrically coupled to the non-inverting terminal 216 (or to the windings 222). Further, the variable VRS detection threshold device 406 is coupled between the inverting terminal 218 of the VRS comparator 210 and ground, and the ECM 408 is coupled to the output terminal 220 of the VRS comparator 210 so as to receive the output signal(s) output therefrom.

The ECM 408 can take a variety of forms depending upon the embodiment. For example, in some embodiments, the ECM 408 can be a microprocessor or be formed by way of embedded logic. Also, although the ECM 408 is shown in FIG. 4 as being distinct from the VRS 208, VRS comparator 210, current source 402, switch 404, and variable VRS detection threshold device 406, in other embodiments, any one or more of these other components can be considered as being part of the ECM 408. The ECM 408 can also perform a variety of functions, and is not merely limited to temperature sensing or to the sensing of crankshaft angle or crankshaft speed. For example, in some embodiments, the ECM 408 can be used to control any of choke actuation, ignition, and/or fuel injector operation.

In the present embodiment of FIG. 4, the ECM 408 particularly is configured to control operations of each of the current source 402, the switch 404, and the variable VRS detection threshold device 406 as represented by arrows 412, 414, and 416, respectively. More particularly, as represented by the arrow 412, the ECM 408 is capable of controlling the on/off status and magnitude (or polarity) of the current output by the current source 402. Also, as represented by the arrow 414, the ECM is capable of controlling the open/closed status of the switch 404. Further, as represented by the arrow 416, the ECM is capable of controlling the threshold voltage applied at the inverting terminal 218 of the VRS comparator 210 by the VRS detection threshold device 406. Given such operation, the differential voltage experienced by the VRS comparator 210 between the non-inverting terminal 216 and inverting terminal 218 thereof corresponds to the difference between the voltage across of the windings 222 of the VRS 208 and the threshold (or reference) voltage applied by the VRS detection threshold device 406. In this case, the voltage across the windings 222 particularly equals the current passing through those windings (shown in FIG. 4 as "Iforce" and also corresponding to the "Itest" voltage of FIG. 5) multiplied by the resistance of those windings (which can be referred to as "Rwindings" and also corresponds to the resistance Rvrs shown in FIG. 5). By virtue of this arrangement, the resistance of the windings 222 can be measured in several different manners, particularly at times corresponding to the other times 314 already discussed above in regard to FIG. 3 when the output signals provided at the output terminal 220 of the VRS comparator 210 are at a low level rather than a high level. Again, the other times generally correspond to the time periods when the VRS 208 is adjacent to spaces between the magnetic teeth 204 of the trigger wheel 200 rather than adjacent to a particular one of the teeth.

More particularly, assuming that the descriptions of the signals 302, 308, and 310 provided in regard to FIG. 3 are equally applicable in relation to the temperature sensing and control system 400, the temperature sensing and control system 400 operates to measure the resistance of the windings 222 by injecting a forcing current from the current source 402 via the switch 404 that passes through the windings 222 of the VRS 208 during the other times 314 of FIG. 3. At such times, the ECM 408 particularly causes the switch 404 to be closed so that this forcing current can flow to the windings 222, but otherwise causes the switch 404 to be opened during the times 312.

Further, in the present embodiment, the ECM 408 determines the resistance of the windings 222 by successively causing the variable VRS detection threshold device 406 to apply two different threshold voltages to the VRS comparator 210 at the inverting input 218. A first of the two different threshold voltages is a $T_{cut-off}$ threshold voltage that corresponds to a temperature threshold below which cold-enrichment is required (e.g., corresponding to a temperature of 70 degrees Fahrenheit, where the temperature is not ambient temperature but rather is the temperature of the first cylinder head 108). Preferably the $T_{cut-off}$ threshold voltage is set in a manner that takes into account both cold starting and restarting after the engine is warm. Additionally, a second of the two different threshold voltages is a $T_{run}$ threshold voltage that corresponds to a stable engine operating temperature. Typically, the ECM 408 operates so that, when one of the magnetic teeth 20 is about to pass by the VRS 208, the variable VRS detection threshold device 406 sets the threshold to one of the two values and then, upon the tooth passing by, the VRS detection threshold device 406 resets the threshold to the other of the two values.

When causing the VRS detection threshold device 406 to apply these two different threshold voltages $T_{cut-off}$ and $T_{run}$, the ECM 408 simultaneously monitors whether the output signal provided at the output terminal 220 is high or low. Depending upon whether the value is high or low when these two different threshold voltages are applied, the ECM then deduces the resistance of the windings 222, which in turn allows the temperature of the first cylinder head 208 to be determined by the ECM. For example, if at a time when the ECM causes the variable VRS detection threshold device 406 to apply the $T_{cut-off}$ threshold voltage the ECM detects a low value of the output signal from the output terminal 220, then the ECM can deduce the resistance of the windings 222 is below a resistance value that would be present at the windings 222 if the windings were being exposed to the temperature threshold below which cold-enrichment is required (e.g., if the windings were being exposed to a temperature of 70 degrees Fahrenheit). Accordingly, the ECM can further deduce that the temperature of the first cylinder head 108 is below that temperature (again, e.g., below 70 degrees Fahrenheit).

Notwithstanding the above description regarding the utilization of thresholds, this description is only intended to be exemplary, and the present disclosure is intended to encompass numerous other embodiments employing any of a variety of manners of operation involving thresholds, including manners of operation that are more complicated than that discussed above, including manners of operation (and embodiments) that employ more thresholds in order to allow for increased resolution of temperature measurement. Further for example, although the above manner of operation allows the ECM 408 to determine whether the temperature at the first cylinder head 108 is above, below, or between the temperatures associated with the $T_{cut-off}$ and $T_{run}$ threshold voltages, in another manner of operation the ECM causes the threshold voltage applied by the VRS detection threshold device 406 to also apply other voltages in between those two threshold voltages. Based upon linear interpolation, the ECM can then make further determinations as to the resistance of the windings 222 of the VRS 208, and thus can make further determinations as to the temperature of the first cylinder head 108. Additionally, in an alternate embodiment, the ECM 408 controls the level (magnitude) of the forcing current applied by the current source 402 rather than (or possibly in combination with) controlling the threshold voltage applied by the VRS detection threshold device 406. Such operation can equally allow for variations in the voltages experienced at the non-inverting terminal 216 and variations in the output signal 220 corresponding to the resistance of the windings 222, and thus also can allow for the ECM 408 to make determinations as to the resistance of the windings and the temperature of the first cylinder head 108. Further, although the above embodiments allow for temperature determinations to be made with a level of resolution that is suitable for certain applications, for higher resolution in other embodiments a measurement system such as an analog-to-digital converter (ADC) corresponding to the measurement system 214 can also or instead be utilized.

Although the exact level of resolution and amount of time required for making a measurement can vary depending upon the embodiment, for at least one example embodiment these can be defined and calculated as follows. Suppose that the temperature coefficient of resistance ($\alpha$) for copper (cu) is 0.4% per degree Celsius, that the resistance of the windings of the VRS 208 is 200 ohms (about 150 ohms to about 300 ohms is typical), and that the forcing current is 6.25 mA (=1.25 V/200 ohms, where 1.25V=BG or band gap voltage). With such an embodiment, the resolution can be 0.8 ohms/degree Celsius (200 ohms times 0.004), 5 mV/degree Celsius for 200 ohms & 6.25 mA, and 4 degrees Celsius for an 8 bit, 5V ADC (5/255 approximately equals 19.6 mV/bit). Thus, one degree or better resolution is possible, for example, using a 12 bit controller. Further, in a lawn mower implementation, the temperature range of operation can extend from (or from about) 0 degrees Celsius to (or to about) 100 degrees Celsius, and in a chain saw application the range of operation can extend from (or from about) −40 degrees Celsius to (or to about) 120 degrees Celsius, and additionally the dynamic range can be 0.8 V (=5 mV/degree Celsius times 160 degrees Celsius). Finally, an example measurement time in a lawn mower application can be approximately 1.5 milliseconds (assuming crankshaft rotation of 3000 rpm, 60 sec/minute, 12 teeth, and 12 spaces or valleys & missing a tooth), and an example measurement time in a chain saw application can be approximately 18,000 rpm (with all of the same assumptions as made with respect to the lawn mower application, which implies ⅙ the time).

The present invention is intended to encompass numerous embodiments including those disclosed herein and variations of those embodiments. In at least some example embodiments, the present invention relates to a system for determining a temperature of a first portion of an internal combustion engine. The system includes a wheel having a plurality of magnetic teeth spaced around a perimeter of the wheel, the wheel being coupled at least indirectly to a crankshaft of the engine so that a wheel rotational speed is at least indirectly related to a crankshaft rotational speed. The system also includes an electrical circuit including a variable reluctance sensor (VRS) including at least one winding, the VRS being positioned proximate the wheel so that the magnetic teeth pass by the VRS during rotation of the wheel, and a comparator having first and second input terminals and an output terminal, where the at least one winding is electrically coupled to the first input terminal. The VRS is mounted on the engine so as to be in thermal contact with the first portion of the engine, and the comparator is configured to output an output signal at the output terminal that is indicative of whether a first voltage applied to the first input terminal is lesser or greater than a second voltage applied to the second input terminal. Either the output signal or a further signal generated by the electrical circuit is at least indirectly indicative of a resistance of the at least one winding, whereby an indication of the temperature of the first portion of the engine can be determined based upon the output signal or further signal that is at least indirectly indicative of the resistance.

Additionally, in at least some such embodiments, the electrical circuit further includes at least one additional component that is also electrically coupled to the first input terminal or to the second input terminal, where the at least one additional component includes a measurement system. Also, in at least some such embodiments, the measurement system includes either an ohmmeter or an analog-to-digital converter (ADC). Further, in at least some such embodiments, the measurement system is configured to sense one or both of a voltage applied to the first input terminal or a current flowing to or from the at least one winding. Additionally, in at least some such embodiments, the electrical circuit further includes at least one additional component that is also electrically coupled to the first input terminal or to the second input terminal, where the at least one additional component includes a current source that is electrically coupled to the first input terminal. Further, in at least some such embodiments, the current source is electrically coupled to the first input terminal by way of a switch. Also, in at least some such embodiments, the current source is configured to generate a forcing current that is communicated to the at least one winding. Additionally, in at least some such embodiments, the at least one additional component includes a voltage detection threshold device that is coupled to the second input terminal and configured to apply at least one voltage to the second terminal, where the at least one voltage includes the second voltage. Further, in at least some such embodiments, the voltage detection threshold device is configured to be controllable so as to apply each of the second voltage to the second terminal and a third voltage to the second terminal. Also, in at least some such embodiments, the system further includes an electronic control module (ECM) that is electrically coupled to the output terminal. Additionally, in at least some such embodiments, the electrical circuit further includes at least one additional component that is also electrically coupled to the first input terminal or to the second input terminal, where the at least one additional component includes a switch, a current source device that is electrically coupled to the first input terminal by way of the switch, and a voltage detection threshold device that is electrically coupled to the second input terminal. Also, in at least some such embodiments, the ECM is configured to provide at least one control signal to one or more of the switch, the current source device, and the voltage detection threshold device at a time when an output signal from the output terminal does not indicate that one of the magnetic teeth is substantially aligned with the VRS. Further, in at least some such embodiments, the electrical circuit is configured to operate to generate the signal that is at least indirectly indicative of the resistance of the at least one winding only at one or more times when an output signal provided at the output terminal does not indicate that one of the magnetic teeth is substantially aligned with the VRS. Also, the present invention further relates, in at least some embodiments, to an apparatus comprising the engine and system recited above, where the apparatus is either a lawn mower or a chain saw.

Further, in at least some example embodiments, the present invention relates to a circuit for use in determining a temperature of a first portion of an internal combustion engine. The circuit includes a variable reluctance sensor (VRS) including at least one winding and configured to generate a current upon being exposed to a changing magnetic flux due to a rotation of a wheel having magnetic teeth in proximity thereto, and a comparator having first and second input terminals and an output terminal, where the at least one winding is electrically coupled to the first input terminal. The comparator is configured to output an output signal at the output terminal that is indicative of whether a first voltage applied to the first input terminal is lesser or greater than a second voltage applied to the second input terminal. Either the output signal or a further signal generated by the circuit is at least indirectly indicative of a resistance of the VRS that is in turn utilized directly or indirectly to determine the temperature of the first portion of the engine.

Also, in at least some such embodiments, the circuit further includes at least one additional component that is also electrically coupled to the first input terminal, where the at least one additional component includes either a measurement system component or a current source component, where the at least one additional component is configured to interact with the VRS during a time when the output signal provided at the output terminal is not at a level indicating that one of the magnetic teeth is substantially aligned with the VRS. Further, in at least some such embodiments, the at least one additional component includes the measurement system component, and the measurement system component is either an ohmmeter or an analog-to-digital converter (ADC). Additionally, in at least some such embodiments, the at least one additional component includes the current source component, which is electrically coupled to the first input terminal by way of a switching component, where the temperature is determined at least in part by way of an interpolation operation, wherein the circuit also includes a voltage detection threshold device, where the second voltage applied to the second input terminal is provided by the voltage detection threshold device, and where the voltage detection threshold device is configured so as to be controllable so as to provide either of two different voltage levels as the second voltage.

Additionally, in at least some example embodiments, the present invention relates to a method of operation for determining a temperature of a first portion of an internal combustion engine. The method includes rotating a wheel having a plurality of magnetic teeth that are spaced apart from one another around the wheel, so that at first times the magnetic teeth are substantially aligned with a variable reluctance sensor (VRS) and at second times none of the magnetic teeth are substantially aligned with the VRS but rather respective spaces between the magnetic teeth are substantially aligned with the VRS. The method also includes determining when one of the second times is occurring, and detecting during one of the second times one or more of (a) a first voltage applied at a first terminal of a comparator electrically coupled to a winding of the VRS, (b) a first current provided to or from at least one winding of the VRS, and (c) an output signal from the comparator, so as to detect a signal that is at least indirectly indicative of a resistance of the at least one winding, where the signal that is at least indirectly indicative of the resistance is further at least indirectly indicative of the temperature. Further, in at least some such embodiments, the method also includes controlling one of a choking mechanism, a spark plug actuation, and a fuel injector actuation based at least in part upon the determined temperature.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A system for determining a temperature of a first portion of an internal combustion engine, the system comprising:
    a wheel having a plurality of magnetic teeth spaced around a perimeter of the wheel, the wheel being coupled at least indirectly to a crankshaft of the engine so that a wheel rotational speed is at least indirectly related to a crankshaft rotational speed;
    an electrical circuit including
        a variable reluctance sensor (VRS) including at least one winding, the VRS being positioned proximate the wheel so that the magnetic teeth pass by the VRS during rotation of the wheel, wherein the VRS is mounted on the engine so as to be in thermal contact with the first portion of the engine;
        a comparator having first and second input terminals and an output terminal, wherein the at least one winding is electrically coupled to the first input terminal, and wherein the comparator is configured to output an output signal at the output terminal that is indicative of whether a first voltage applied to the first input terminal is lesser or greater than a second voltage applied to the second input terminal; and
        at least one additional component that is also electrically coupled to one or more of the first input terminal, the second input terminal, or the output terminal, wherein the at least one additional component includes a measurement system or an electronic control module (ECM),
    wherein either the output signal or a further signal generated by the electrical circuit is at least indirectly indicative of a resistance of the at least one winding, and
    wherein the electrical circuit is configured to operate so that the output signal or further signal that is at least indirectly indicative of the resistance is generated only at one or more times when the output signal provided at the output terminal does not indicate that one of the magnetic teeth is substantially aligned with the VRS, wherein an indication of the temperature of the first portion of the engine can be determined based upon the output signal or further signal that is at least indirectly indicative of the resistance.

2. The system of claim 1, wherein the at least one additional component is electrically coupled to the first input terminal or to the second input terminal, and wherein the at least one additional component includes the measurement system.

3. The system of claim 2, wherein the measurement system includes either an ohmmeter or an analog-to-digital converter (ADC).

4. The system of claim 2, wherein the measurement system is configured to sense one or both of a voltage applied to the first input terminal or a current flowing to or from the at least one winding.

5. The system of claim 1, wherein the at least one additional component is electrically coupled to the first input terminal or to the second input terminal, and wherein the at least one additional component includes a current source that is electrically coupled to the first input terminal.

6. The system of claim 5, wherein the current source is electrically coupled to the first input terminal by way of a switch.

7. The system of claim 5, wherein the current source is configured to generate a forcing current that is communicated to the at least one winding.

8. The system of claim 5, wherein the at least one additional component includes a voltage detection threshold device that is coupled to the second input terminal and configured to apply at least one voltage to the second terminal, wherein the at least one voltage includes the second voltage.

9. The system of claim 8, wherein the voltage detection threshold device is configured to be controllable so as to apply each of the second voltage to the second terminal and a third voltage to the second terminal.

10. The system of claim 1, wherein the at least one additional component includes the ECM, which is electrically coupled to the output terminal.

11. The system of claim 10, wherein the at least one additional component includes a switch, a current source device that is electrically coupled to the first input terminal by way of the switch, and a voltage detection threshold device that is electrically coupled to the second input terminal.

12. The system of claim 11, wherein the ECM is configured to provide at least one control signal to one or more of the switch, the current source device, and the voltage detection threshold device at one of the times.

13. An apparatus comprising the engine and system of claim 1, wherein the apparatus is either a lawn mower or a chain saw.

14. A circuit for use in determining a temperature of a first portion of an internal combustion engine, the circuit comprising: a variable reluctance sensor (VRS) including at least one winding and configured to generate a current upon being exposed to a changing magnetic flux due to a rotation of a wheel having magnetic teeth in proximity thereto; a comparator having first and second input terminals and an output terminal, wherein the at least one winding is electrically coupled to the first input terminal, and wherein the comparator is configured to output an output signal at the output terminal that is indicative of whether a first voltage applied to the first input terminal is lesser or greater than a second voltage applied to the second input terminal, and at least one additional component that is also electrically coupled to one or more of the first input terminal, the second input terminal, or the output terminal, wherein the at least one additional component includes a measurement system or an electronic control module (ECM), wherein either the output signal or a further signal generated by the circuit is at least indirectly indicative of a resistance of the VRS that is in turn utilized directly or indirectly to determine the temperature of the first portion of the engine, and wherein, the electrical circuit is configured to operate so that the output signal or further signal that is at least indirectly indicative of the resistance is generated only at one or more times when the output signal provided at the output terminal does not indicate that one of the magnetic teeth is substantially aligned with the VRS.

15. The circuit of claim 14, wherein the at least one additional component is also electrically coupled to the first input terminal, wherein the at least one additional component includes either the measurement system component or a current source component, wherein the at least one additional component is configured to interact with the VRS the one or more times.

16. The circuit of claim 15, wherein the at least one additional component includes the measurement system component, and wherein the measurement system component is either an ohmmeter or an analog-to-digital converter (ADC).

17. The circuit of claim 15, wherein the at least one additional component includes the current source component, which is electrically coupled to the first input terminal by way of a switching component, wherein the temperature is determined at least in part by way of an interpolation operation, wherein the circuit also includes a voltage detection threshold device, wherein the second voltage applied to the second input terminal is provided by the voltage detection threshold device, and wherein the voltage detection threshold device is configured so as to be controllable so as to provide either of two different voltage levels as the second voltage.

18. A system for determining a temperature of a first portion of an internal combustion engine, the system comprising:
a wheel having a plurality of magnetic teeth spaced around a perimeter of the wheel, the wheel being coupled at least indirectly to a crankshaft of the engine so that a wheel rotational speed is at least indirectly related to a crankshaft rotational speed;
a variable reluctance sensor (VRS) including at least one winding, the VRS being positioned proximate the wheel so that the magnetic teeth pass by the VRS during rotation of the wheel, wherein the VRS is mounted on the engine so as to be in thermal contact with the first portion of the engine;
a comparator having first and second input terminals and an output terminal, wherein the at least one winding is electrically coupled to the first input terminal, and wherein the comparator is configured to output an output signal at the output terminal that is indicative of whether a first voltage applied to the first input terminal is lesser or greater than a second voltage applied to the second input terminal;
a switch, a current source device that is electrically coupled to the first input terminal by way of the switch, and a threshold device that is electrically coupled to the second input terminal; and
an electronic control module (ECM) that is electrically coupled to the output terminal, wherein a determination regarding an angular position or a rotational movement of the crankshaft is made based at least in part upon one or more first values of the output signal that occur at during one or more first time periods when any of the magnetic teeth is or are substantially aligned with the VRS,
wherein the ECM is configured to provide at least one control signal to one or more of the switch, the current source device, and the threshold device during one or more second time periods when an output signal from the output terminal does not indicate that any of the magnetic teeth is or are substantially aligned with the VRS, and
wherein the one or more second time periods do not include any of the one or more first time periods, and the ECM determines the resistance of the at least one winding based at least in part upon one or more second values of the output signal occurring during the one or more second time periods, the resistance being indicative of the temperature.

19. The system of claim 18, wherein the current source is configured to generate a forcing current that is communicated to the at least one winding, and wherein the threshold device is configured to be controllable so as to apply each of the second voltage to the second terminal and a third voltage to the second terminal.

20. The system of claim 19, Wherein the ECM is configured to determine the resistance based upon two or more of the second values of the output signal that occur in response to each of the second and third voltages being applied to the second terminal.

* * * * *